(12) United States Patent
Gretz

(10) Patent No.: US 8,302,265 B1
(45) Date of Patent: Nov. 6, 2012

(54) WIRE GRIPPER FOR SUPPORTING AN ELECTRICAL BOX OR SUSPENDED LOAD

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 264 days.

(21) Appl. No.: 12/927,152

(22) Filed: Nov. 8, 2010

Related U.S. Application Data

(63) Continuation-in-part of application No. 12/660,426, filed on Feb. 26, 2010, now Pat. No. 8,158,882, which is a continuation-in-part of application No. 12/655,514, filed on Dec. 30, 2009, now Pat. No. 8,076,573.

(51) Int. Cl.
*F16G 11/00* (2006.01)

(52) U.S. Cl. .................. 24/135 A; 24/135 R; 24/136 B; 24/115 H; 24/115 K; 24/525; 24/569

(58) Field of Classification Search ........................ None
See application file for complete search history.

(56) References Cited

U.S. PATENT DOCUMENTS

| | | | | |
|---|---|---|---|---|
| 209,233 A * | 10/1878 | Cox | ............. | 24/135 R |
| 475,261 A * | 5/1892 | Winton | ............. | 140/2 |
| 479,777 A * | 8/1892 | Ashworth | ............. | 403/213 |
| 559,443 A * | 5/1896 | Duhy | ............. | 188/65.5 |
| 584,235 A * | 6/1897 | Nesmith et al. | ............. | 174/155 |
| 748,716 A * | 1/1904 | Ford | ............. | 439/781 |
| 866,876 A * | 9/1907 | Meech | ............. | 403/391 |
| 976,906 A * | 11/1910 | Page | ............. | 256/55 |
| 1,185,932 A * | 6/1916 | Poirier | ............. | 24/135 R |
| 1,321,660 A * | 11/1919 | Moriarty | ............. | 24/135 R |
| 1,338,062 A * | 4/1920 | Wolfe | ............. | 403/209 |
| 1,667,345 A * | 4/1928 | Cummins | ............. | 24/135 R |
| 1,738,374 A * | 12/1929 | Krechmer | ............. | 24/135 R |
| 1,873,559 A * | 8/1932 | Dibner | ............. | 403/396 |
| 2,134,623 A * | 10/1938 | Rowe | ............. | 439/764 |
| 2,208,358 A * | 7/1940 | Chandler | ............. | 248/540 |
| 2,288,844 A * | 7/1942 | Schilling | ............. | 248/66 |
| 2,288,845 A * | 7/1942 | Schilling | ............. | 248/66 |
| 2,381,331 A * | 8/1945 | Ayers | ............. | 439/791 |
| 2,395,204 A * | 2/1946 | Symons | ............. | 24/569 |
| 2,462,969 A * | 3/1949 | Holliday | ............. | 188/65.1 |
| 2,497,030 A * | 2/1950 | Lewis | ............. | 439/793 |
| 2,634,475 A * | 4/1953 | Browne | ............. | 24/135 N |
| 2,712,167 A * | 7/1955 | Blanchard | ............. | 24/569 |
| 2,775,422 A * | 12/1956 | Von Herbulis et al. | ............. | 248/63 |
| 2,953,796 A * | 9/1960 | Deviatka | ............. | 12/103 |
| 3,238,584 A * | 3/1966 | Lassen et al. | ............. | 403/206 |
| 3,319,306 A * | 5/1967 | Von Tersch | ............. | 24/71.1 |
| 3,396,438 A * | 8/1968 | White | ............. | 24/707.7 |
| 3,509,521 A * | 4/1970 | Gutshall | ............. | 439/781 |
| 4,011,397 A * | 3/1977 | Bouche | ............. | 174/42 |

(Continued)

*Primary Examiner* — Jack W. Lavinder

(57) ABSTRACT

A wire gripper for positively locking a wire in place between an overhead support and a suspended load such that it can support the suspended load and maintain tension on the wire. The wire gripper includes an elongated body with a through bore and a threaded bore intersecting the through bore. Two open channels extend through the body parallel with and on either side of the threaded bore. A threaded fastener extends into the threaded bore. A U-shaped clip member with two legs is carried by the threaded fastener. By passing one or more wires through the through bore and tightening the fastener, six points of contact can be brought to bear against the inserted wires and thereby lock the wires with respect to the wire gripper.

16 Claims, 7 Drawing Sheets

U.S. PATENT DOCUMENTS

| | | | | |
|---|---|---|---|---|
| 4,471,159 A * | 9/1984 | Frank, Jr. | ................... | 174/94 R |
| 4,601,451 A * | 7/1986 | Leonardo | ................... | 248/74.1 |
| 4,604,888 A * | 8/1986 | Mayszak | ................... | 72/332 |
| 4,646,395 A * | 3/1987 | Mayszak | ................... | 24/135 R |
| 4,662,035 A * | 5/1987 | Hatfield | ................... | 24/135 R |
| 4,706,345 A * | 11/1987 | Rockenfeller et al. | ...... | 24/135 L |
| 4,912,814 A * | 4/1990 | McKenzie | ................... | 24/115 H |
| 5,000,705 A * | 3/1991 | Kinka et al. | ................... | 439/797 |
| 5,129,844 A * | 7/1992 | Goto et al. | ................... | 439/778 |
| 5,367,251 A * | 11/1994 | McTigue | ................... | 324/133 |
| 5,514,159 A * | 5/1996 | Matula et al. | ................... | 606/232 |
| 5,845,372 A * | 12/1998 | Smith et al. | ................... | 24/168 |
| 6,120,505 A | 9/2000 | Huebner | | |
| 6,327,753 B1 * | 12/2001 | Rushing | ................... | 24/135 N |
| D474,679 S | 5/2003 | Malin | | |
| D501,394 S | 2/2005 | Franks, Jr. et al. | | |
| 7,367,534 B2 | 5/2008 | Franks, Jr. | | |
| 7,618,280 B2 | 11/2009 | Horst | | |
| 7,793,390 B2 * | 9/2010 | Mills et al. | ................... | 24/129 R |
| 2005/0015940 A1 * | 1/2005 | Stafford | ................... | 24/135 N |

* cited by examiner

WIRE GRIPPER FOR SUPPORTING AN ELECTRICAL BOX OR SUSPENDED LOAD

This application is a Continuation-In-Part of U.S. patent application Ser. No. 12/660,426 filed Feb. 26, 2010 now U.S. Pat. No. 8,158,882, which is a Continuation-In-Part of U.S. patent application Ser. No. 12/655,514 filed Dec. 30, 2009 now U.S. Pat. No. 8,076,573, all of which are incorporated herein in their entireties by reference thereto.

FIELD OF THE INVENTION

The present invention relates to devices for the installation of electrical outlet or junction boxes and more particularly to a wire gripping device useful for the suspension of electrical outlet or junction boxes from above as might be required in suspended ceiling installations and the like.

BACKGROUND OF THE INVENTION

Commonly owned parent application Ser. Nos. 12/660,426 and 12/655,514 presented a system for the adjustable suspension of electrical outlet, junction box or the like comprising in combination an elongated wire for attachment to an existing fixed overhead member, a wire gripper including a passageway there through, and a knockout engagement device that engages an opening in an electrical junction or outlet box and further includes an engagement mechanism for engaging the elongated wire as it passes from a fixed overhead member through the passageway to the engagement member and returns thereto through the passageway where it is secured by an appropriate screw, bolt or the like.

Through further experimentation and modification of various elements in the system for the adjustable suspension of an electrical box, it has been found that unexpected and surprising beneficial results can be achieved by providing a wire gripper with a multi legged clip which increased the number of contact points on a wire held therein and therefore enabled increased gripping force on a wire secured therein.

The present invention therefore provides an improved wire gripper with an increased number of contact points for securing a wire therein.

SUMMARY OF THE INVENTION

According to the present invention, there is provided a wire gripper for positively locking a wire in place between an overhead support and a suspended load such that it can support the suspended load and maintain tension on the wire. The wire gripper includes an elongated body with a through bore and a threaded bore intersecting the through bore. Two open channels extend through the body parallel with and on either side of the threaded bore. A threaded fastener extends into the threaded bore. A U-shaped clip member with two legs is carried by the threaded fastener. By passing one or more wires through the through bore and tightening the fastener, six points of contact can be brought to bear against the inserted wires and thereby lock the wires with respect to the wire gripper.

OBJECTS AND ADVANTAGES

Several advantages are achieved with the wire gripper of the present invention, including:
(1) The wire gripper can be used to rapidly suspend an electrical box or similar load from a support.
(2) The wire gripper will maintain tension on the suspended load while supporting it in place.
(3) The wire gripper provides six separate points of contact to create positive locking of a wire inserted therein.
(4) The wire gripper requires only a screwdriver to effect a secure gripping action on a wire.
(5) The wire gripper overcomes a major disadvantage with slippage caused by oil or grease in prior art wire gripping devices. Oil or grease has no effect on the holding power of the wire gripper of the present invention.
(6) The wire gripper will support an off center load whereas prior art gripping devices are often marked with warning labels which caution against supporting off center loads.
(7) The wire gripper will work in conjunction with conventional support wires of several diameters including 0.062-inch, 0.080-inch, and 0.093-inch diameter wires.
(8) The wire gripper will support loads up to 150 pounds.

These and other objects and advantages of the present invention will be better understood by reading the following description along with reference to the drawings.

Figure 2:
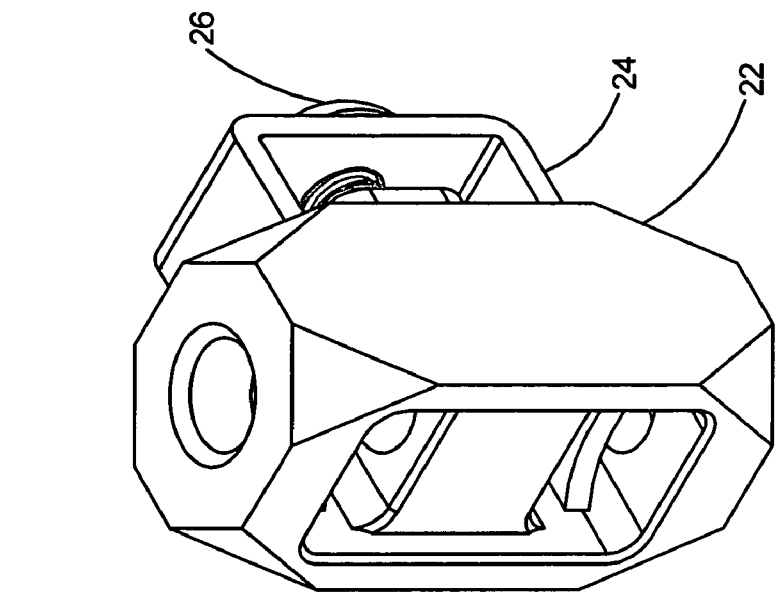
FIG. 2 is a rear perspective view of the wire gripper of FIG. 1.

INDEX TO REFERENCE NUMERALS IN DRAWINGS 20 wire gripper, preferred embodiment
22 body
24 clip
26 fastener or screw
28 base portion of body
30 end of body
32 first side of body
34 second side of body
36 lateral side of body 38 boss
40 through bore
42 threaded bore
44 channel
46 end portion of body
48 ledge
49 ends of ledge
50 longitudinal axis
52 center section of clip
54 aperture
56 leg
57 leg end
58 side of leg
60 arcuate surface
62 wire
64 point of contact
66 electrical box
68 fixture hanger
70 knockout
D1 diameter of the through bore
D2 diameter of the wire

DETAILED DESCRIPTION OF THE INVENTION

Figure 1:
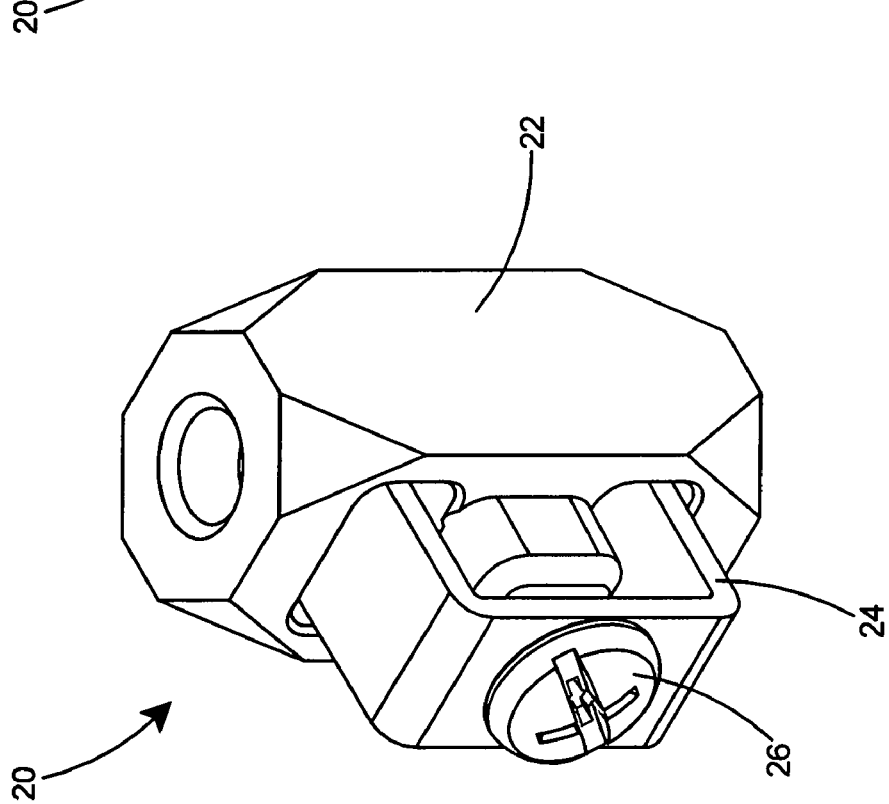
FIG. 1 is a front perspective view of a preferred embodiment of a wire gripper according to the present invention.
Figure 4:
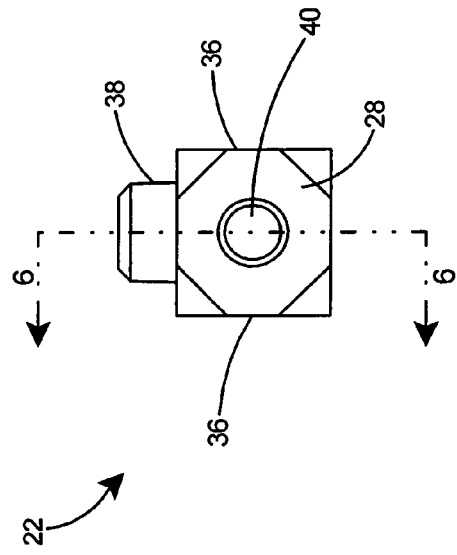
FIG. 4 is an end view of the wire gripper body.

With reference to FIGS. 1 and 2 there is shown a preferred embodiment of a wire gripping device or wire gripper 20 according to the present invention. The wire gripper 20 is an assembly of several parts including a body 22, a clip 24, and a fastener or screw 26.

Figure 6:
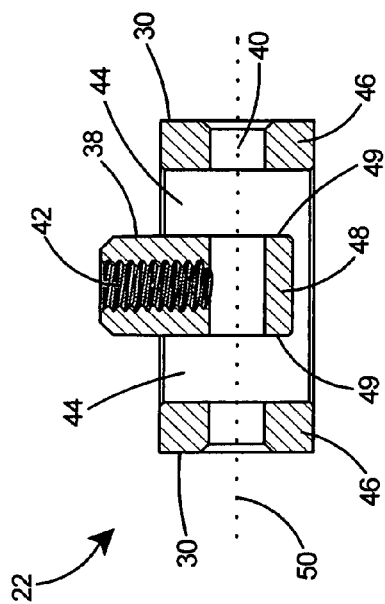
FIG. 6 is a sectional view of the body taken along line 6-6 of FIG. 4.
Figure 3:
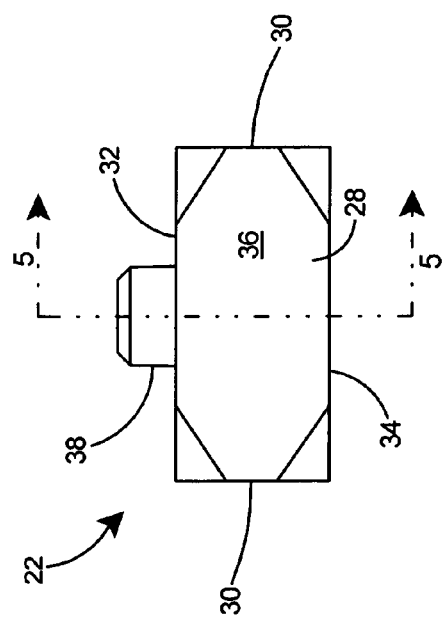
FIG. 3 is a side view of a body that forms a portion of the wire gripper of FIG. 1.
Figure 5:
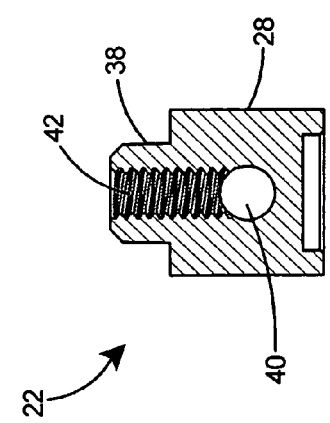
FIG. 5 is a sectional view of the body taken along line 5-5 of FIG. 3.
Figure 7:
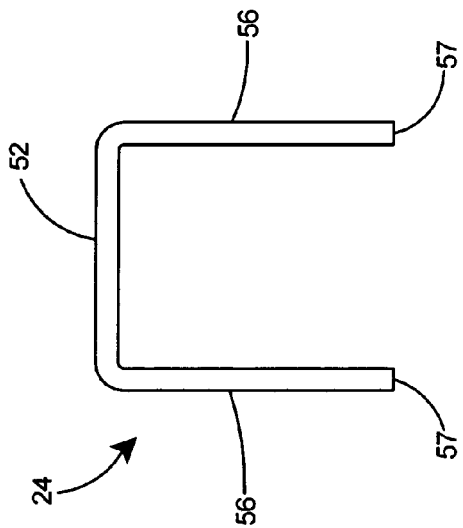
FIG. 7 is a perspective view of a clip member that forms a portion of the wire gripper of FIG. 1.

Referring to FIGS. 3-6, the wire gripper body 22 preferably is constructed of metal and includes a base portion 28 having two ends 30, a first side 32, a second side 34, and two lateral sides 36. A boss 38 is integral with the base 28 and extends orthogonally there from. A through bore 40 extends longitudinally through the base 28 to both ends 30. A threaded bore 42 is centered in and extends through the boss 38 all the way to the through bore 40. Although through bore 40 is shown herein as a circular bore in the drawings, it should be understood that through bore 40 can be of various shapes, including square, hexagonal, octagonal, oval, and others, without departing from the scope of the invention. As shown in FIG. 6, two open channels 44, provided on either side of the boss 38, divide the body 22 into end portions 46 at each end 30 of the body 22. The through bore 40 also extends through the boss 38 thereby creating a ledge 48 in the boss 38 immediately below the through bore 40. The ledge 48 includes two ends 49 and is in axial alignment with the threaded bore 42. The various portions of the through bore 40 are in axial alignment along longitudinal axis 50 as shown in FIG. 6.

Figure 8:
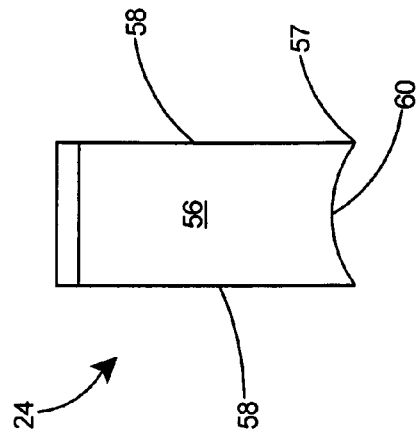
FIG. 8 is a side view of the clip member.
Figure 9:
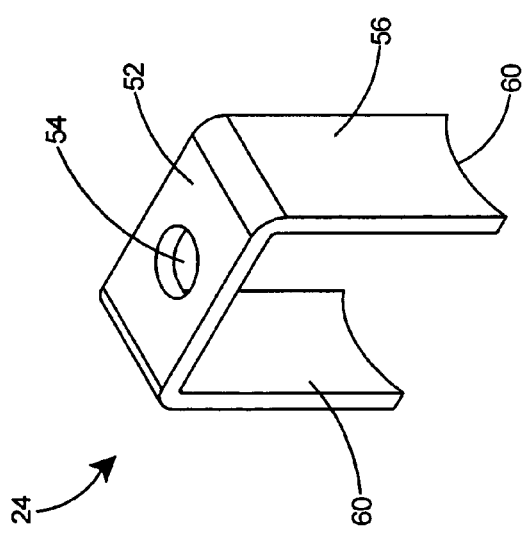
FIG. 9 is a top view of the clip member.
Figure 10:
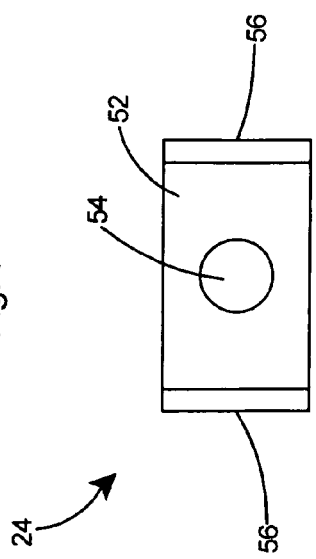
FIG. 10 is an end view of the clip member.
Figure 11:
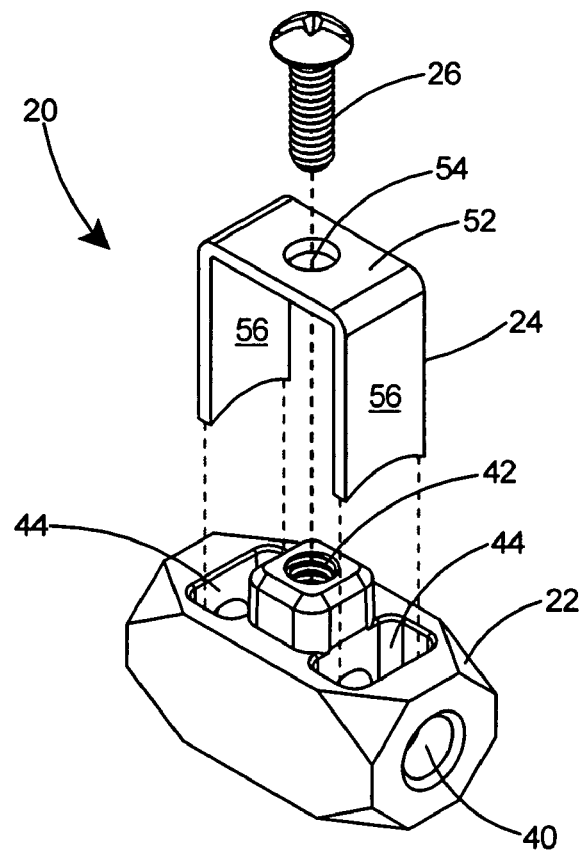
FIG. 11 is a perspective view of the body portion of the wire gripper.
Figure 12:
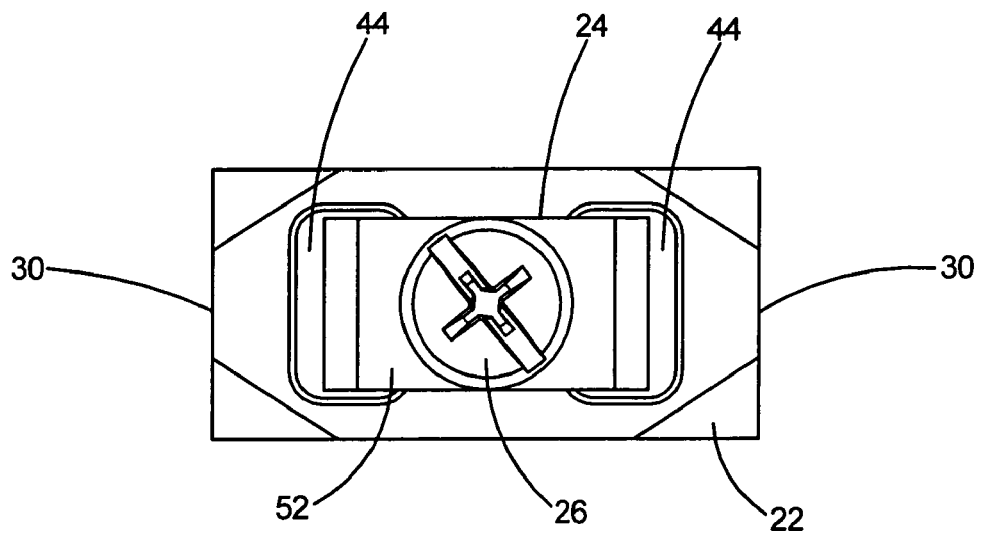
FIG. 12 is a top view of the wire gripper assembly of FIG. 1.
Figure 13:
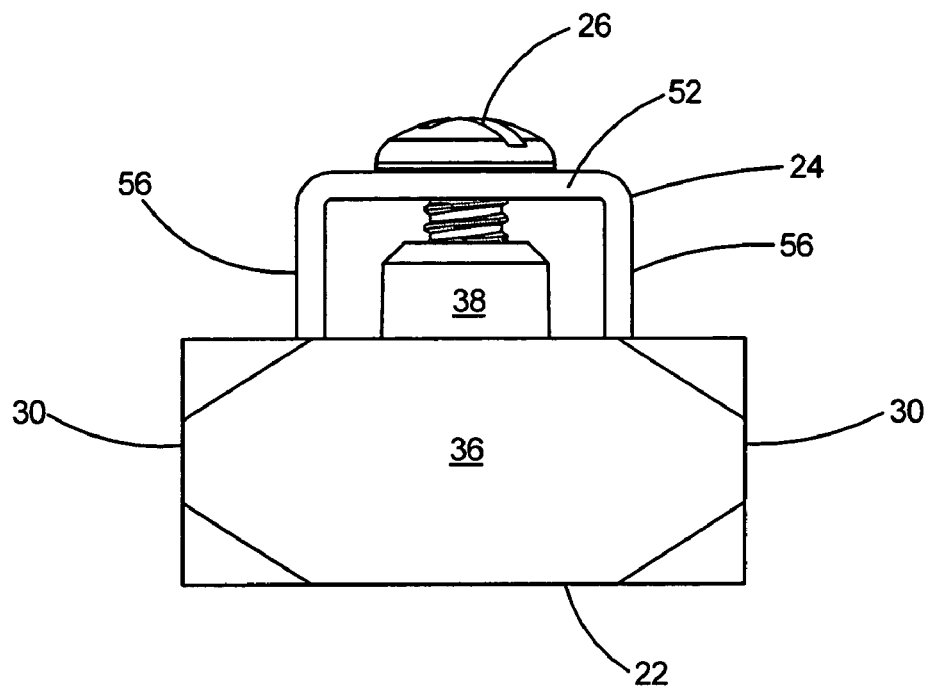
FIG. 13 is a side view of the wire gripper assembly of FIG. 1.

With reference to FIGS. 7-10, the clip member 24 includes a center section 52 with an aperture 54 centered therein and two legs 56 extending orthogonally from the center section. As shown in FIG. 8, the clip 24 is substantially U-shaped with the legs 56 extending to leg ends 57. As shown in FIG. 10, the legs 56 include two sides 58 and the leg ends 57 include a concave arcuate surface 60 extending between the two sides 58 of the legs 56.

Figure 14:
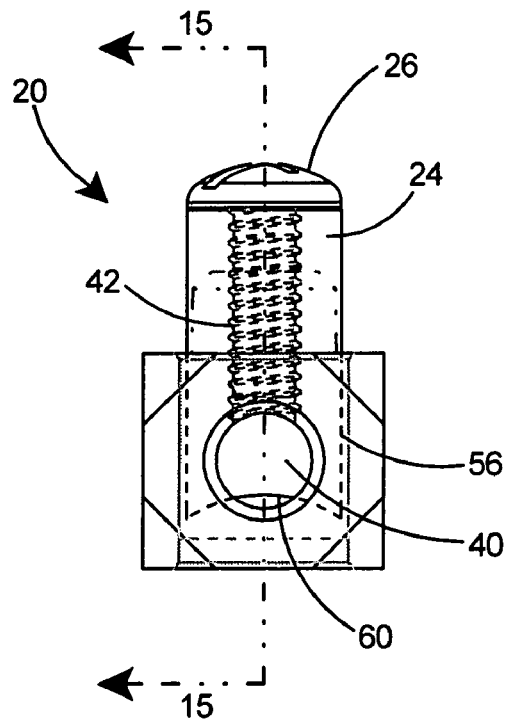
FIG. 14 is an end view of the wire gripper assembly of FIG. 1 with internal components shown in broken lines.

Referring to FIGS. 11-14, the wire gripper 20 is an assembly of the body 22, the clip 24, and the screw 26. When assembled, the screw 26 bears against the center section 52 of the clip 24 and extends into threaded bore 42 in wire gripper body 22. With screw 26 extending through aperture 54 in the center section 52 of the clip 24 and threaded into threaded bore 42, legs 56 of clip member 24 extend into the channels 44 of body 22. As shown in FIG. 14, the arcuate surface 60 of each leg 56 of clip 24 is substantially centered in the through bore 40. Thus as screw 26 is tightened within threaded bore 42, the arcuate surfaces 60 at the ends of each leg 56 will advance farther into each channel 44 of wire gripper body 22.

Figure 15:
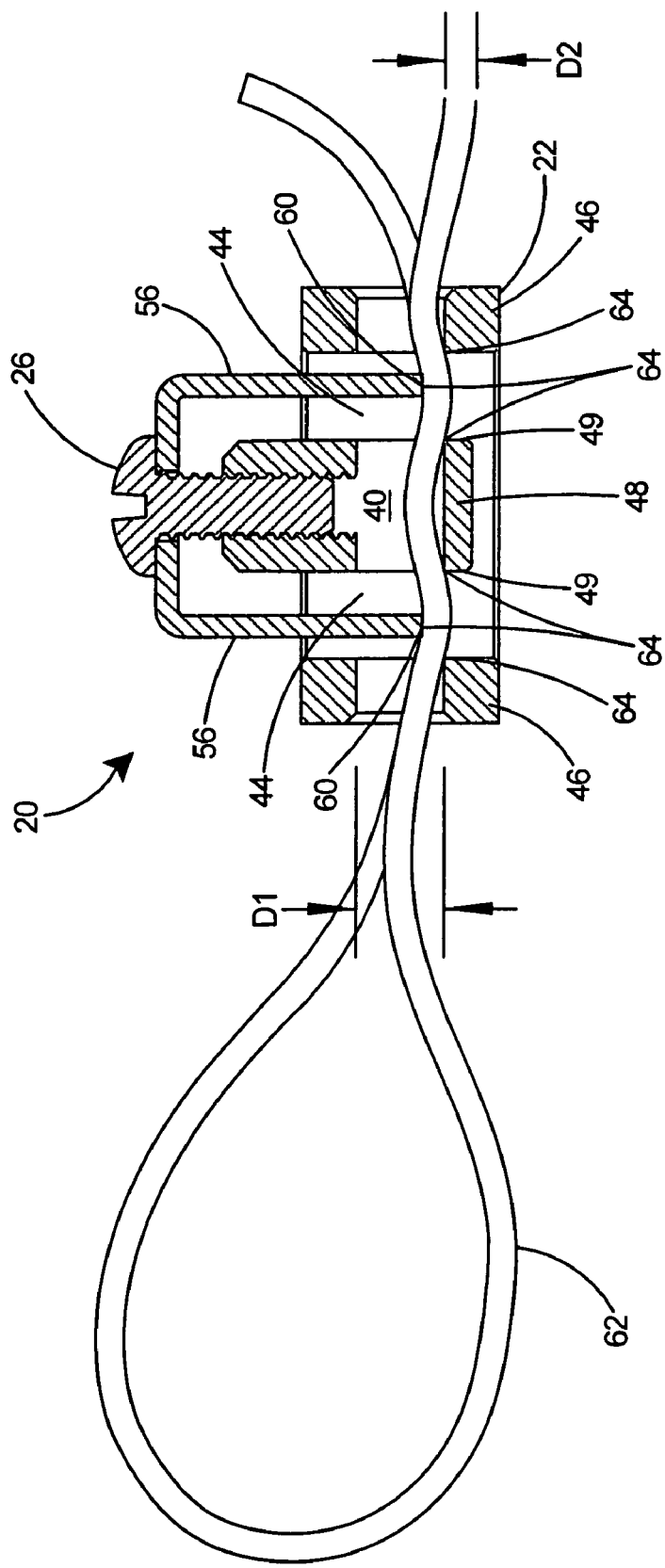
FIG. 15 is a section view of the wire gripper assembly taken along line 15-15 of FIG. 12 including a wire inserted and secured therein.

With reference to FIG. 15, the wire gripper 20 of the present invention is used to anchor or support a suspended load such as an electrical box (not shown). To secure a wire 62 within the wire gripper 20, the screw 26 is first loosened sufficiently to withdraw legs 56 from channels 44, thereby opening through bore 40 and enabling the installer to thread the wire 62 through the through bore 40 one or more times. Preferably the wire 62 is doubled up through the through bore 40 (see FIG. 16). The screw 26 is then tightened using a screwdriver or similar tool (not shown) thereby forcing arcuate surfaces 60 of legs 56 against the wire 62. As arcuate surfaces 60 of legs 56 press against the wire 62, the wire is in turn pressed against both ends 49 of ledge 48 and end portions 46 of body 22. With the screw 26 fully tightened in the wire gripper 20, six points of contact 64 on the wire 62 are established within the wire gripper 20 including at the arcuate surfaces 60 of each leg 56 of clip member 24, at each end portion 46 of body 22, and at each end 49 of the ledge 48. After the screw 26 is fully tightened, the wire gripper 20 securely holds the suspended load. In the preferred embodiment of the wire gripper 20, the diameter D1 of the through bore 40 is at least two and a half times the diameter D2 of the wire 62. For use with a stranded wire 62 having a diameter D2 of 0.080-inch for example, the diameter of the through bore 40 is preferably at least 0.020-inch.

Figure 16:
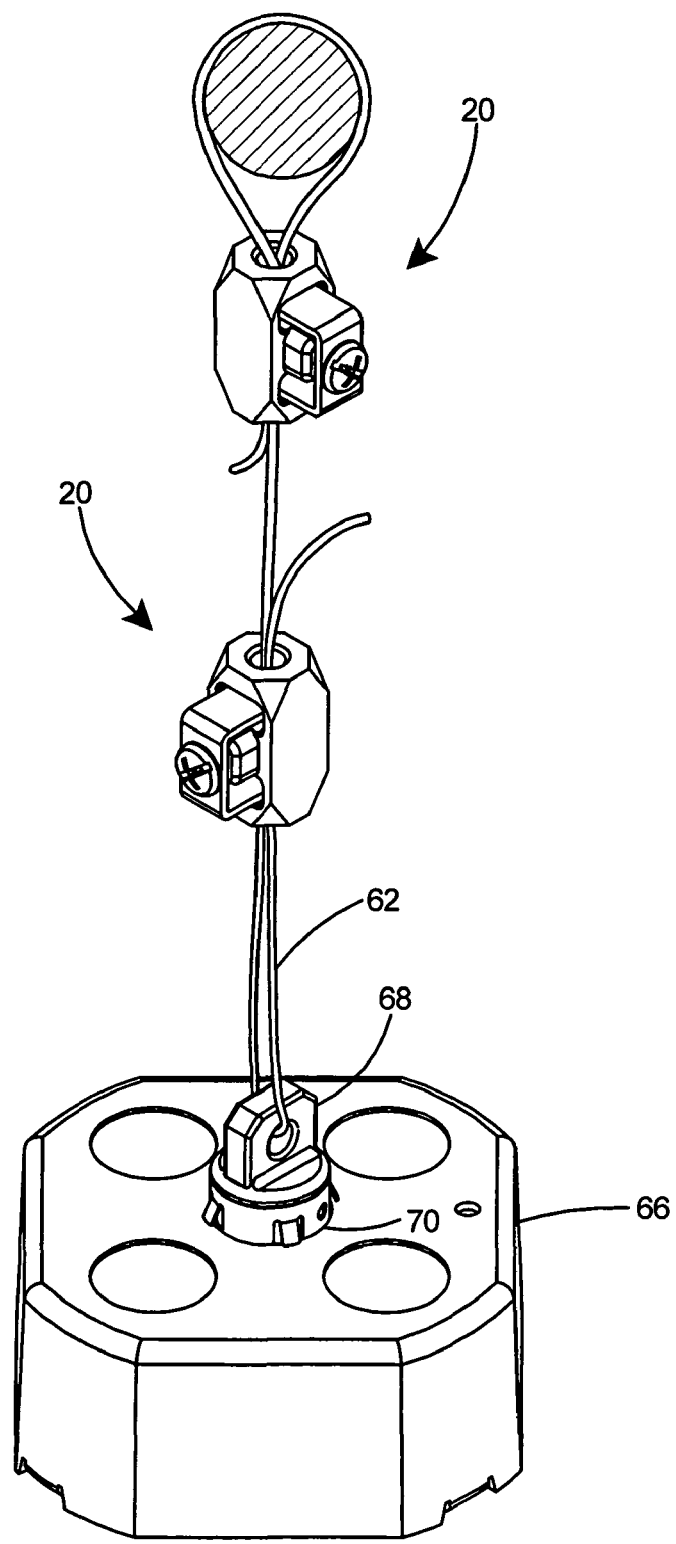
FIG. 16 is a perspective view of the preferred embodiment of two wire grippers according to the present invention with a wire secured therein in each wire gripper supporting an electrical box.

FIG. 16 illustrates an example of the preferred embodiment of a wire gripper 20 according to the present invention supporting an electrical box 66. In this illustration, wire gripper 20 secures wire 62 that has been looped through a fixture hanger 68 that is secured in the knockout 70 of the electrical box 66.

The wire gripper body 22, clip 24, and fastener 26 are all preferably constructed of metal. Preferably, the body 22 is constructed of a die cast alloy. Most preferably, the body 22 is die cast of ZAMAK, a casting alloy comprised mainly of zinc alloyed with aluminum, magnesium, and copper and available from Eastern Alloys of Maybrook, N.Y. Most preferably, the clip 24 is constructed of hot dipped galvanized steel in a thickness of at least 0.093-inch and with a minimum plating thickness of at least 0.0005-inch per side of the clip. It is important that clip 24 have sufficient thickness so that the legs 56 are rigid and therefore bear against an inserted wire when the fastener 26 is fully tightened. Most preferably, the fastener 26 is a #10-24×⅝-inch long zinc plate pan head machine screw. The wire gripper 20 of the present invention is rated to support a load of 50 pounds with a 0.62-inch diameter wire, 100 pounds with a 0.80-inch diameter wire, and 150 pounds with a 0.93-inch diameter wire.

The wire gripper 20 may also be provided in kit form with a wire, such as in combination with a length of wire 62 to serve as the drop wire for supporting a load. Most preferably, the wire is galvanized stranded wire of 7×7 stranded construction having a 0.080-inch (2.0 mm) core diameter, a galvanized zinc plating of at least 0.00015-inch thickness, and a break strength of 500 pounds. Most preferably, at least a 6-foot length of wire 62 is provided for each wire gripper 20 provided in the kit.

The wire gripper 20 may also be provided in a kit in combination with an electrical box 66 and fixture hanger 68, such as the FBS415 electrical box and the FH50 fixture hanger, both available from Arlington Industries, Inc. of Scranton, Pa.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A wire gripper for supporting a load with a wire comprising:
    a die cast metal body including a base having a first side, two ends, and a through bore extending through said base and said ends;
    two open channels extending from said first side through said base, said channels substantially perpendicular to and intersecting said through bore;
    a threaded bore in said first side of said base, said threaded bore between said channels;
    a clip member including a center section having an aperture therein and two legs extending from said center section, said legs of said clip member extending into said channels of said base; and
    a fastener extending through said aperture in said clip member and threaded into said threaded bore in said base,
    whereby inserting said wire through said through bore and tightening said fastener into said threaded bore drives said legs of said clip into said channels and against said wire thereby securing said wire in said wire gripper.

2. The wire gripper of claim 1 including
    leg ends on said legs of said clip; and
    an arcuate surface on each of said leg ends.

3. The wire gripper of claim 2 including
    a boss extending from said first side of said base substantially midway between said channels; and
    said threaded bore is located in said boss.

4. The wire gripper of claim 3 wherein
    said through bore extends through said boss thereby forming a ledge in said boss immediately below said through bore; and
    said ledge includes two ends.

5. The wire gripper of claim 4 wherein said ends of said body include end portions surrounding said through bore.

6. The wire gripper of claim 5 wherein said fastener in a completely tightened state includes six points of contact on said wire.

7. The wire gripper of claim 6 wherein said points of contact include
    said end portions of said body against said wire;
    said arcuate surfaces on said leg ends of said clip against said wire; and
    said ends of said ledge against said wire.

8. The wire gripper of claim 1 wherein said clip and said fastener are constructed of metal.

9. The wire gripper of claim 1 wherein said body is die cast in one piece of zinc die cast alloy.

10. The wire gripper of claim 1 wherein said clip is constructed of hot dipped galvanized steel.

11. The wire gripper of claim 1 wherein said screw is a zinc plated machine screw.

12. The wire gripper of claim 1 wherein said wire is of 7×7 stranded construction with a core diameter of at least 0.080-inch and a breaking load strength rating of at least 500 pounds.

13. The wire gripper of claim 1 wherein said wire gripper is capable of supporting a load of up to 150 pounds.

14. The wire gripper of claim 1 wherein said diameter of said through bore in said body is at least two and a half times the diameter of said wire.

15. The wire gripper of claim 1 wherein said wire gripper is provided in a kit with a length of said wire.

16. The wire gripper of claim 1 wherein said wire gripper is provided in a kit with an electrical box, a fixture hanger, and a length of said wire.

* * * * *